United States Patent [19]

Bourgeois

[11] 4,231,465
[45] Nov. 4, 1980

[54] SELF-TIMING AUTOMATIC CONVEYOR SYSTEM

[76] Inventor: Ronald D. Bourgeois, 38 Ellison Park, Waltham, Mass. 02154

[21] Appl. No.: 955,140

[22] Filed: Oct. 26, 1978

[51] Int. Cl.³ .................. B65G 43/08; B65G 47/26
[52] U.S. Cl. ............................... 198/460; 199/466; 250/223 R
[58] Field of Search ............ 198/460, 531, 524, 467, 198/572, 466, 465, 357; 221/12; 250/223 R, 223 B; 318/480

[56] References Cited

U.S. PATENT DOCUMENTS

| | | | |
|---|---|---|---|
| 1,855,767 | 4/1932 | Neuman | 198/460 |
| 3,162,294 | 12/1964 | Dieter | 198/460 X |
| 3,536,180 | 10/1970 | Dubus | 198/357 |
| 4,008,796 | 2/1977 | Aylon | 198/460 |

*Primary Examiner*—Joseph E. Valenza
*Assistant Examiner*—Douglas D. Watts
*Attorney, Agent, or Firm*—Joseph S. Iandiorio

[57] ABSTRACT

A self-timing automatic conveyor system including a low-friction conveyor belt, a holding mechanism actuatable to open and close for selectively controlling flow of goods along a conveyor belt; a control sensor circuit including a first sensor proximate the conveyor belt and adjacent the holding mechanism for monitoring the flow of goods along the conveyor belt to the holding mechanism; a transfer sensor circuit including a second sensor spaced downstream from the first sensor and proximate the conveyor belt for monitoring the flow of goods along the conveyor belt released by the holding mechanism; first gating means, enabled by the control sensor circuit upon the presence of goods at the position of the first sensor and by the transfer sensor upon the passing of goods released during the previous cycle of operation by the holding mechanism, for actuating the holding mechanism to the open condition to pass goods upon receipt of an external signal; and second gating means enabled by the transfer sensor circuit upon the passing of goods released by the holding mechanism, for actuating the holding mechanism to the closed condition.

7 Claims, 6 Drawing Figures

SELF-TIMING AUTOMATIC CONVEYOR SYSTEM

FIELD OF INVENTION

This invention relates to a self-timing automatic conveyor system which controls delivery of goods in response to the motion of previously released goods.

BACKGROUND OF INVENTION

Present automated packaging machines such as those that perform filling, capping and labelling functions place difficult and somewhat inconsistent burdens on conveyor systems which service them. Feeder conveyor systems must be capable of holding back product to match the needs of the machines yet avoid damage to the produce caused by the dragging of the belt along the bottom of the goods and by the pressure on the goods as they back up against the holding device. In addition, on request, these machines often require a conveyor system to transition from a dead stop to sixty to one hundred or more units of goods per minute. Many present conveyor systems are designed to deliver at full speed or not at all, without provision for buffering their delivery to continuously accommodate the needs of the machine serviced.

SUMMARY OF INVENTION

It is therefore an object of this invention to provide an improved self-timing conveyor system which can maintain control over delivery of goods in response to the motion of goods released for delivery.

It is a further object of this invention to provide an improved conveyor system which can block or hold back goods with minimum back pressure and drag.

It is a further object of this invention to provide an improved conveyor system which can vary its delivery rate quickly from full-stop to full-speed easily and with control over delivery, self-timed in response to goods previously released for delivery, to prevent stacking up of goods.

The invention results from the realization that a fast response, low back-pressure conveyor system which responds to motion of goods even after their release by a holding mechanism can be accomplished with a self-timing automatic system in which the holding mechanism is enabled to be actuated when there are goods at a first position adjacent the holding mechanism and is actuated to open an external or internal periodic or aperiodic signal and release goods, if goods released by the holding mechanism during the previous cycle of operation have passed a second position spaced downstream from the first position, and is actuated to close when goods released by the holding mechanism during this cycle have passed that second position.

The invention features a self-timing automatic conveyor system which includes a low-friction conveyor belt and a holding mechanism actuatable to open and close for selectively controlling flow of goods along the conveyor belt. There is a control sensor circuit which includes a first sensor proximate the conveyor belt and adjacent the holding mechanism for monitoring the flow of goods along the conveyor belt up to the holding mechanism. A transfer sensor circuit includes a second sensor spaced downstream from the first sensor and proximate the conveyor belt for monitoring the flow of goods along the conveyor belt after release by the holding mechanism. First gating means, enabled by the control sensor circuit upon the presence of goods at the position of the first sensor and by the transfer sensor circuit upon the passing of goods released during the previous cycle of operation by the holding mechanism, actuates the holding mechanism to the open condition to pass goods upon the receipt of an external signal. Second gating means, enabled by the transfer sensor circuit upon the passing of goods released by the holding mechanism, actuates the holding mechanism to the closed condition.

The holding mechanism may include a first pressure member mounted above the conveyor belt and extending downwardly to contact the top of the goods when the holding machanism is closed. Alternatively, the holding mechanism may include a first member which is mounted above the conveyor belt and which extends downwardly to obstruct the goods when the holding mechanism is closed. There may be a second pressure member, mounted below the conveyor belt and aligned with the first presssure member, which extends upwardly to contact the bottom of the goods when the holding mechanism is closed. Alternatively, a pressure member may be used on either one or both sides of a conveyor belt, whereby outward lateral extension of the member traps or grips the goods on the conveyor belt. With two members vertically aligned above and below the belt, the conveyor belt includes two sections laterally spaced from each other with the lower pressure member between them.

DISCLOSURE OF PREFERRED EMBODIMENT

Other objects, features and advantages will occur from the following description of a preferred embodiment and the accompanying drawing, in which.

The self-timing automatic conveyor system according to this invention may be accomplished using a holding mechanism and controls which are either electrically, hydraulically, or pneumatically operated, or operated by some combination of two or more of these. For example, the holding mechanism may be one or more solenoids, such as a Mac Valve #821B-111C-152 made by Mac Valves, Inc., Wixon, Mich., and the control sensor circuit and the transfer sensor circuit may include photoelectric cells with switching contacts such as Eye-Photo Switch #42RC-1, Model 4000; Photo Electric Box #60-1610; or Control Photo Switch #2DJ4, Model 4000, all made by Photoswitch, Cambridge, Massachusetts; and suitable switching or gating circuits which may be included in the photoelectric circuits. A holding mechanism such as a Cylinder-Upper Tom Thumb #AVF ¾×8 D 807 or a Cylinder-Lower Tom Thumb #AVF ¾×½ D 807, made by Tom Thumb, Inc., Ft. Wayne, Ind., is advantageous since it is adjustable to exert a predetermined amount of force regardless of the distance the piston is extended.

Figure 1:
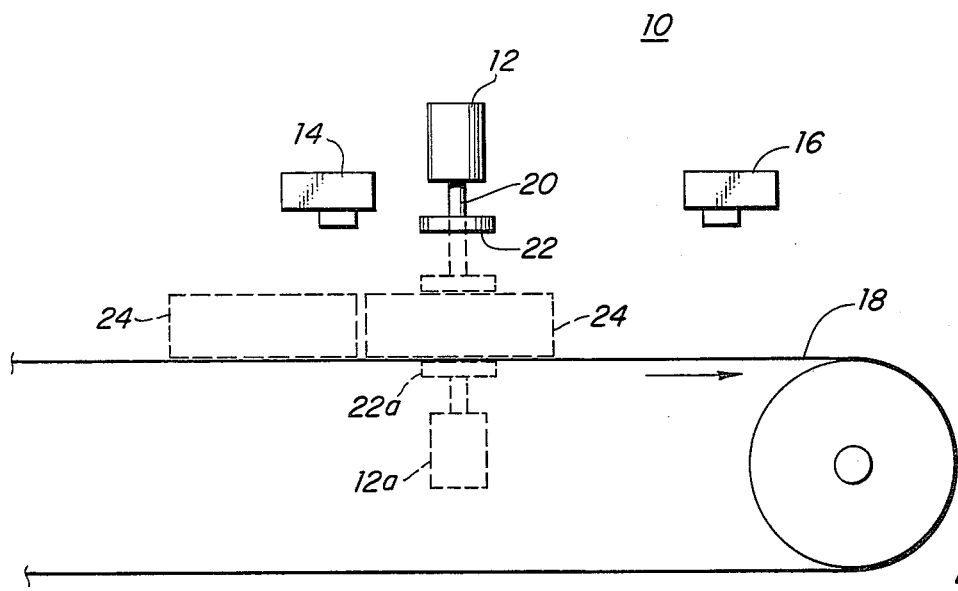
FIG. 1 is an elevational schematic diagram of a self-timing automatic conveyor system according to the invention.
Figure 2:
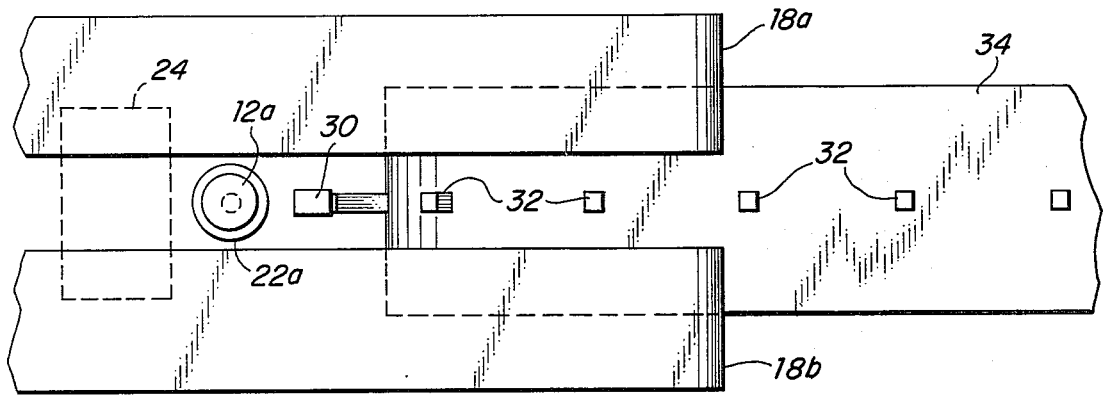
FIG. 2 is a schematic plan view of a system similar to that in FIG. 1.

There is shown in FIG. 1 a self-timing automatic conveyor system according to this invention 10 including a holding mechanism, solenoid 12, and a control sensor circuit and transfer sensor circuit, photoelectric circuits 14, 16, respectively, which are arranged proximate conveyor belt 18. Photoelectric circuit 14 is adjacent solenoid 12 and photoelectric circuit 16 is spaced downstream from circuit 14 and solenoid 12. Control sensor circuit 14 and transfer sensor circuit 16 need not be located in their entirety as shown. It is sufficient if their sensing portion, such as the photoelectric cell, is positioned as described with respect to solenoid 12 and conveyor belt 18. The system is indifferent to the position of the remainder of those circuits. When solenoid 12 is actuated to the closed position, the pressure member, piston 20, and pad 22, extends as shown in dashed lines so that it presses on goods 24 on conveyor belt 18. Holding mechanism 12 may include a second solenoid 12a, FIG. 2 which extends upwardly a very slight amount so that its pad 22a just slightly lifts goods 24 off the conveyor belt 18. When two solenoids are used they should be axially aligned to prevent any twisting or rotating of the goods 24. When lower solenoid 12a is used, conveyor belt 18 may include two sections 18a and 18b spaced apart so that solenoids 12a may be located between them beneath the plane of the belt.

Figure 3:
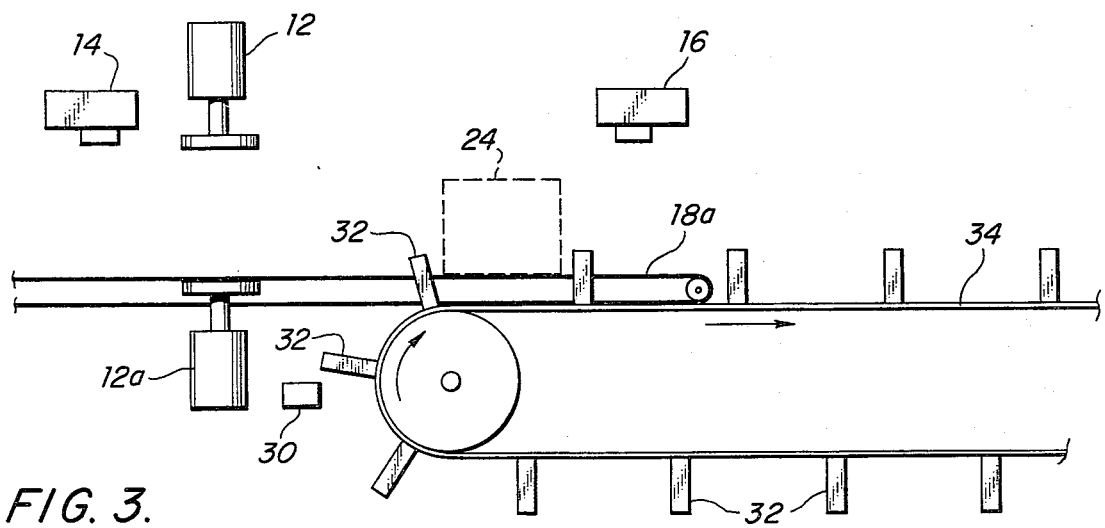
FIG. 3 is an elevational schematic diagram of the system shown in FIG. 2.
Figure 4:
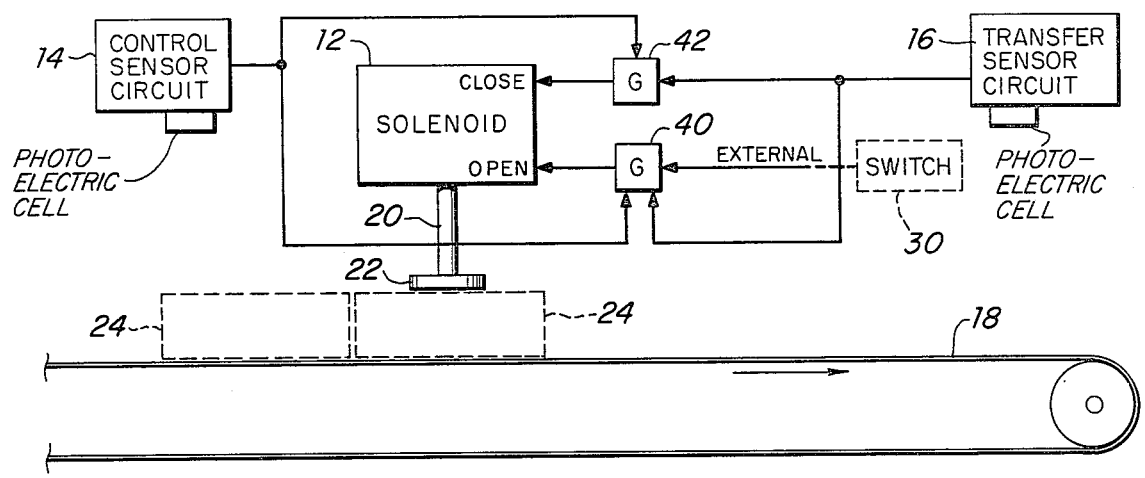
FIG. 4 is a schematic diagram of the interconnection of the transfer and control circuits according to this invention.

The external timing signal which actuates the holding mechanism, solenoids 12 and 12a, may be supplied from a machine being serviced or from a micro-switch 30 which is tripped by flights 32 of flighted conveyor belt 34, which flights intercept and further convey the goods 24, FIG. 3.

In operation, control sensor circuit 14 senses the presence of goods 24 at its position when solenoid 12 is actuated to the closed position and pad 22 is holding goods 24 against conveyor belt 18. In this condition, control sensor circuit 14 is providing an enabling signal to each of gate circuits 40, 42. If at this time goods from the previous cycle of operation have cleared sensor circuit 16, it provides the second necessary enabling input to gate 40. Thus, upon the next occurrence of an external signal such as, for example, from switch 30 tripped by a flight 34, that external signal is passed by enabled gate 40 to actuate solenoid 12 to the open position, retracting piston 20 and pad 22 and releasing goods 24 to travel downstream on conveyor 18. Subsequently, when goods 24 pass transfer sensor circuit 16, it provides a signal to gate 42 which, enabled by control sensor circuit 14, passes that signal directly to solenoid 12 to actuate it to the closed position, whereby piston 20 descends and pad 22 grips goods 24. Thus in the event that the goods 24 stack up at some subsequent station beyond transfer sensor circuit 16 so that the accumulation extends to transfer sensor circuit 16, the necessary signal to enable gate 40 is not present and the external signals destined to open solenoid 12 are not gated through to it to cause that actuation; and solenoid 12 therefore remains in the closed position and prevents further supply of goods until the condition is cleared.

The distance between transfer sensor circuit 16 and solenoid 12 is set in accordance with the length of the goods 24 along the direction of movement of conveyor belt 18 and the number of pieces of goods 24 that it is desired to release during each cycle of operation. The farther transfer sensor circuit 16 is positioned from solenoid 12, the greater the accommodation in size of goods and number of pieces of goods during each cycle of operation of solenoid 12.

Figure 5:
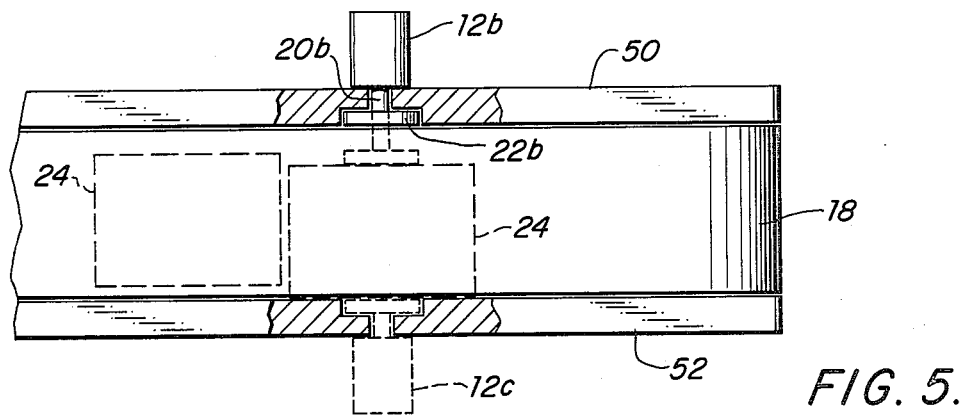
FIG. 5 is a plan view of an alternative construction of the system according to this invention.

Although thus far the solenoids have been shown positioned above or below the conveyor belt, this is not a necessary limitation of the invention; as shown in FIG. 5 the solenoid 12b may be placed alongside of conveyor belt 18 mounted in side wall 50, so that when solenoid 12b is actuated to the closed position, piston 20b extends outwardly laterally and moves pad 22b against the side of goods 24, pressing it against the opposite side wall 52; or alternatively, against a second, similarly actuated, laterally operating solenoid 12c.

Figure 6:
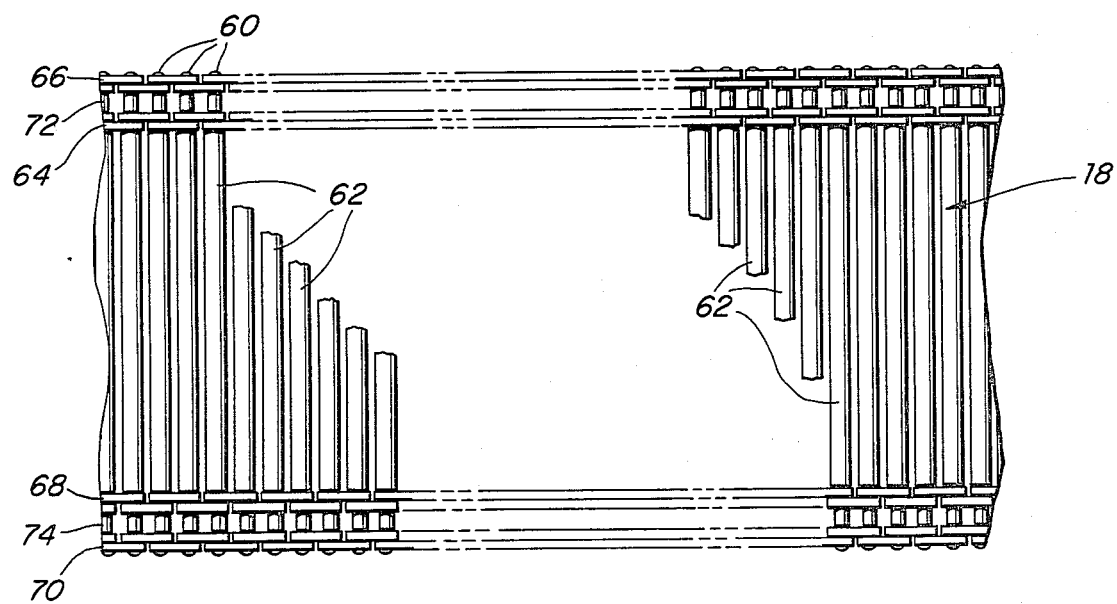
FIG. 6 is a plan view of a low-friction roller belt used in the system of this invention.

Low-friction belt 18, FIG. 6, includes a plurality of pins 60 on which are mounted main rollers 62. At each side of main rollers 62 there may be carried two sets of links 64, 66, 68, and 70, with smaller rollers 72, 74, between them, respectively, to form chain-like drive sections which may be driven by sprockets in the normal fashion. Rollers 62 are freely rotatable on pins 60, and are made of a low-friction material such as Teflon, Delron, or similar material, whereby belt 18 typically provides 10% or less back pressure on the goods held by the holding mechanism.

Other embodiments will occur to those skilled in the art and are within the following claims:

What is claimed is:

1. A self-timing automatic conveyor system comprising:
   a low-friction conveyor belt;
   a holding mechanism actuatable to open and close for selectively controlling flow of goods along said conveyor belt;
   a control sensor circuit including a first sensor proximate said conveyor belt and adjacent said holding mechanism for monitoring flow of goods along said conveyor belt up to said holding mechanism;
   a transfer sensor circuit including a second sensor spaced downstream from said first sensor and proximate said conveyor belt for monitoring flow of goods along said conveyor belt released by said holding mechanism;
   first gating means, enabled by said control sensor circuit upon the presence of goods at the position of said first sensor and by said transfer sensor circuit upon the passing of goods released during the previous cycle of operation by said holding mechanism, for actuation of said holding mechanism to the open condition to pass goods upon receipt of an external signal; and
   second gating means enabled by said transfer sensor circuit upon the passing of goods released by said holding mechanism, for actuating said holding mechanism to the closed condition.

2. The conveyor system of claim 1 in which said holding mechanism includes a first pressure member which is mounted above said conveyor belt and which extends downwardly to contact the top of the goods when said holding mechanism is closed.

3. The conveyor system of claim 1 in which said holding mechanism includes a first pressure member which is mounted above said conveyor belt and which extends downwardly to obstruct the goods when said holding mechanism is closed.

4. The conveyor system of claim 2 in which said holding mechanism further includes a second pressure member which is mounted below said conveyor belt and aligned with said first pressure member, and which extends upwardly to contact the bottom of the goods when said holding mechanism is closed.

5. The conveyor system of claim 1 in which said holding mechanism includes a first pressure member mounted on one side of said conveyor belt which extends laterally outwardly to contact the side of the goods and there is a pressure plate on the other side of the conveyor belt.

6. The conveyor system of claim 1 in which said holding mechanism includes first and second pressure members which are on either side of said conveyor belt and which extend laterally outwardly to contact opposite sides of the goods.

7. The conveyor system of claim 4 in which said conveyor belt includes two sections laterally spaced from each other with the said second pressure member between them.

* * * * *